United States Patent
Herwig et al.

[11] 3,865,780
[45] Feb. 11, 1975

[54] FLAME RESISTANT THERMOPLASTIC POLYESTERS

[75] Inventors: Walter Herwig, Neuenhain, Taunus; Werner Racky, Wiesbaden, both of Germany

[73] Assignee: Hoechst Aktiengesellschaft, Frankfurt, Germany

[22] Filed: Aug. 1, 1973

[21] Appl. No.: 384,426

[30] Foreign Application Priority Data
Aug. 3, 1972  Germany............................ 2238222

[52] U.S. Cl........ 260/45.7 PS, 260/40 R, 260/75 P, 260/75 S
[51] Int. Cl............................................. C09k 3/28
[58] Field of Search.......... 260/45.7 PS, 75 P, 75 T, 260/503, 947

[56] References Cited
UNITED STATES PATENTS
2,071,354  2/1937  Morgan.............................. 260/947
2,957,905  10/1960  Gaertner............................ 260/947
3,629,365  12/1971  Gardner............................. 260/857
3,681,281  8/1972  Juelke et al....................... 260/45.8

Primary Examiner—Donald E. Czaja
Assistant Examiner—R. A. White
Attorney, Agent, or Firm—Curtis, Morris & Safford

[57] ABSTRACT

Flame resistant molding compositions from linear saturated polyesters and an alkali metal salt of a dialkylphosphinyl-alkanesulfonic acid of the formula

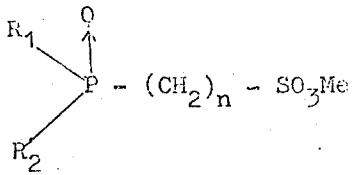

where $R_1$ and $R_2$ each are alkyl having from 1 to 4 carbon atoms, $n$ represents integers of from 1 to 12 and Me is an alkali metal atom.

4 Claims, No Drawings

FLAME RESISTANT THERMOPLASTIC POLYESTERS

The present invention relates to flame resistant thermoplastic polyesters.

It is known that an addition of red phosphorus or organic compounds of phosphorus to thermoplastics has an effect on the behaviour of the polymers on combustion and may bring about a good protection against combustion.

The organic phosphorus compounds hiterto known, however, have the disadvantage of an insufficient stability under the manufacturing and processing conditions required for saturated polyesters, of an insufficient chemical inertness or a too high vapor pressure which causes them to volatilize at thermal load applied to the polyester, especially under reduced pressure.

It has not been found that flame resistant molding compositions from linear saturated polyesters, the polyester mass of which contains an alkali metal salt of a dialkyl-phosphinyl-alkanesulfonic acid of the formula

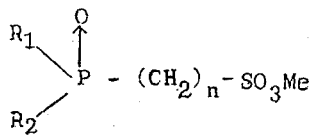

in which $R_1$ and $R_2$ each are alkyl groups having from 1 to 4 carbon atoms, preferably from 1 to 2 carbon atoms, $n$ represents integers of from 1 to 12, preferably from 1 to 6, especially from 1 to 4, and Me is an alkali metal atom, do not have the aforementioned disadvantages.

The alkali metal salts of dialkyl-phosphinyl-alkanesulfonic acids may be advantageously prepared by reaction of dialkyl-halogeno-alkyl-phosphine oxides with alkali metal sulfites. These compounds are not claimed within the scope of the present patent application, since they are the subject of application Ser. No. 384,425 filed Aug. 1, 1973.

Alkali metal salts of dialkyl-phosphinyl-alkanesulfonic acids are thermally stable; they neither decompose saturated polyesters during the processing nor affect the manufacturing process of such thermoplastics.

When, for example, diglycol terephthalate is subjected to a condensation in the melt in the presence of sodium salt of dimethyl-phosphinyl-methanesulfonic acid, the condensation is not affected by this addition. The resulting polyester is colorless, it has the expected molecular weight, it can be after-condensed in the solid phase and injection-molded on the usual processing machines.

It is not necessary to add these phosphorus compounds exactly at the start of the ester interchange or the condensation in the melt; they may be added at any other time in the polyester manufacture. It is also possible to blend the flame retarding additives with finished polyester granules, to either process this mixture directly, for example on injection-molding machines, or to melt it in an extruder, to granulate it and to process it to molded articles after drying.

The concentration of the dialkyl-phosphinyl-alkanesulfonates is advantageously from 3 to 20 percent by weight, preferably from 7 to 15 percent by weight, relative to the weight of the polyester, depending on the desired flame protection.

The special advantages of this process reside in the fact that on combustion phosphorus and sulfur remain in the burnt residue, so that no volatile, insalubrious or corrosive reaction products are formed.

The molding compositions of the invention are self-extinguishing. The flame-retarding effect of the added compound has been tested according to ASTM D 635-68 using little rods having a length of 12.7 cm and a width of 1.27 cm. At a content of only 8 percent of sodium salt of dimethyl-phosphinyl-ethanesulfonic acid, a good flame protection was achieved.

The linear saturated polyester used has a reduced specific viscosity (measured at 25°C in a 1 percent solution in 60:40 phenol/tetrachloroethane) of from 0.6 to 2.0 dl/g, preferably from 0.9 to 1.6 dl/g.

It is also possible to use polyesters having a low reduced specific viscosity and to adjust the desired viscosity by after-condensation, optionally in the solid phase. Besides the alkali metal salts of dialkyl-phosphinyl-alkanesulfonic acids in accordance with the present invention, also inorganic fiber materials may be added to the molding composition in usual quantities, such as glass fibers or fibers of quartz or asbestos.

The thickness of especially the glass fibers is from 0.1 to 50 microns, preferably from 3 to 15 microns, their length is from 0.01 to 5 mm, preferably from 0.05 to 1 mm. The amount of the fibers is up to 50 percent by weight, preferably from 10 to 30 percent by weight, relative to the molding composition.

Furthermore, the molding composition may also contain other known additives, such as stabilizers, lubricants, dyestuffs or fillers, nucleating agents or antistatics.

As linear saturated polyester, polyethyleneglycol terephthalate or polybutylene terephthalate is preferably used.

The polyesters are prepared according to known processes. For example, the preparation of polyethyleneglycol terephthalate starts advantageously from a lower dialkyl ester of terephthalic acid, preferably from the dimethyl ester, which is transesterified with an excess of glycol in the presence of suitable catalysts to form the bis-hydroxy-ethyl ester of terephthalic acid. In this process, the temperature of 140°C is increased to 210°–220°C. The aliphatic alcohol set free is distilled off. For the polycondensation carried out at temperatures of from 210° to 250°C, the pressure is gradually reduced to a value below 1 torr.

Instead of polyethyleneglycol terephthalate, such modified polyethylene terephthalates may be made flameproof according to the present invention which, besides terephthalic acid, contain also other aromatic or aliphatic dicarboxylic acids as acid component, for example isophthalic acid, naphthalene-2,6-dicarboxylic acid or adipic acid. Instead of the glycol, other saturated aliphatic or cyclo-aliphatic diols may be used, for example butanediol 1,4 or 1,4-dimethylol-cyclohexane. There may be prepared also modified polyethylene terephthalates which, besides ethyleneglycol, may contain other diols as alcohol component, for example neopentylglycol. The amount of modifying acid or diol components should not exceed 10 percent by weight, relative to the total amount of dicarboxylic acid or diol. The polyester molding composition made flameproof in accordance with the present invention is suitable for the manufacture of shaped articles, for example by molding, injection-molding, or extrusion. In the case of injection-molding, it is advantageous to heat the mold to a temperature of from 20° to 160°C, preferably from 100° to 150°C, since in this case the polyester amount of the molding composition, with the aid of a nucleating agent, crystallizes to a degree which ensures a high rigidity and hardness of the molded articles. These articles furthermore are distinguished by low shrinkage and high dimensional stability.

The polyester molding composition in accordance with the present invention is especially suitable for the manufacture of casings, construction parts of electric apparatus, mechanical transmission parts of automatic machines, hollow pieces, construction parts of data processing systems and other sensitive electronic apparatus. Also sheets and fibers may be advantageously prepared from these polyester molding compositions according to known processes.

The following examples illustrate the invention.

EXAMPLE 1:

A mixture of 1,000 parts of dimethyl terephthalate, 800 parts of ethylene glycol and 31 parts of manganese acetate is slowly heated to 225°C, while stirring; thereby distilling off methanol via a column until the ester interchange is complete. By raising the temperature to 270°C, the excess of ethyleneglycol is expelled. After addition of 10 parts of sodium salt of dimethyl-phosphinyl-methanesulfonic acid and 0.035 parts of germanium phosphite, the polycondensation is carried out under a final pressure of 0.1 torr while increasing the temperature to 275°C. The finished polyester should have a relative specific viscosity of from 0.75 to 0.95 dl/g. After discharge from the condensation vessel, the polymer strand is granulated, and the granules are given a reduced specific viscosity (RSV) of 1.40 dl/g by condensation in the solid phase at 230°C and 0.1 to 0.2 torr.

Without any difficulty, the polyester granules are molded to form plates at a temperature of from 230° to 250°C and a pressure of 100 atmospheres. Little test rods having a dimension of 12.7 × 1.3 cm are cut from these plates. According to the recommendations of ASTM designation D 635-68, the flame retarding effect is demonstrated; the results are listed in Table 1.

EXAMPLE 2:

790 g of dimethyl terephthalate and 790 g of butanediol-1,4 are mixed in a 2 liter steel vessel, 6.32 g of an ester interchange catalyst are added under a nitrogen blanket, and the whole is slowly heated to 210°C with agitation. The methanol set free is distilled off via a column until the ester interchange reaction is complete. After addition of 100 g of sodium salt of dimethyl-phosphinyl-methanesulfonic acid, the temperature is slowly raised to 230°C, and simultaneously the pressure is reduced to a final vacuum of 0.1 torr. After having reached this final vacuum, the temperature is slowly raised to a final 260°C. The polyester discharged and granulated according to Example 1 has a reduced specific viscosity of 1.52 dl/g. The behaviour-on-combustion test is carried out as indicated in Example 1 and the results are listed in Table 1.

TABLE 1

| Example | Polyester | RSV molded plate | Addition | weight % Addition | Result acc. to ASTM D 635–68 |
|---|---|---|---|---|---|
| 1 | Polyethylene terephthalate | 1.15 | DPMA 1) | 10 | nf to SE |
| 2 | Polybutylene terephthalate | 1.35 | DPMA 1) | 11 | SE |
| 3 | Polyethylene terephthalate | 1.10 | DPEA 2) | 8 | SE |
| 4 | Polyethylene terephthalate | 1.12 | DPMA 1) | 13 | nf |

1) sodium salt of dimethyl-phosphinyl-methane sulfonic acid
2) sodium salt of dimethyl-phosphinyl-ethane sulfonic acid
nf = non flammable
SE = self-extinguishing

What is claimed is:

1. A flame resistant molding composition based on linear saturated polyesters wherein the polyester mass contains an alkali metal salt of a dialkyl-phosphinyl-alkanesulfonic acid of the formula

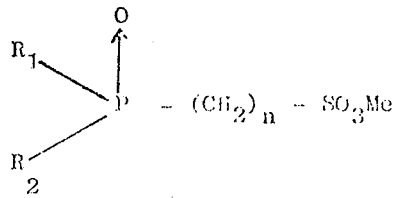

where $R_1$ and $R_2$ each are alkyl groups having from 1 to 4 carbon atoms, $n$ represents integers of from 1 to 12 and Me is an alkali metal atom.

2. A flame resistant molding composition as claimed in claim 1, which comprises from 3 to 20 percent by weight, relative to the weight of the polyester, of the flame-retarding addition component.

3. A flame-resistant molding composition as claimed in claim 1 wherein the flame-retardant addition component is the sodium salt of dimethyl-phosphinyl-methane sulfonic acid.

4. A flame-resistant molding composition as claimed in claim 2 containing from 7 to 15 percent by weight of the flame-retarding addition component.

* * * * *